July 29, 1969  J. L. LAURITSEN  3,457,980
AIR COOLED SIDEWALL TIRE CONSTRUCTION
Filed July 12, 1965

INVENTOR
James L. Lauritsen
By
Robert A. Halvorsen

United States Patent Office 3,457,980
Patented July 29, 1969

---

3,457,980
AIR COOLED SIDEWALL TIRE CONSTRUCTION
James L. Lauritsen, Ruskin, Fla., assignor of forty percent to Edna Mae Greene, St. Petersburg Beach, Fla.
Filed July 12, 1965, Ser. No. 470,998
The portion of the term of the patent subsequent to Jan. 29, 1985, has been disclaimed
Int. Cl. B60c 5/04, 13/00
U.S. Cl. 152—353                                     2 Claims

ABSTRACT OF THE DISCLOSURE

The invention relates to a pneumatic tire, the sidewall of which is provided with a spiral rib running in a direction opposite to the normal direction of rotation, which rib aids in cooling of the tire during operation.

---

This invention relates to an improved configuration for the sidewalls of pneumatic rubber tires for motor vehicles.

It is well known in the art that modern high speed travel on the highways results in the development of heat in pneumatic tires which shortens the useful life of such tires, and on occasions causes the tire to burst, leading to accidents, injuring persons and property.

Some of this heat is created by the friction between the tire and the road surface, but the major portion of heat is developed by the flexure of the sidewalls of the tire.

In order to achieve stylish low silhouettes for automobiles and to provide the smoothest possible ride, the trend in recent years has been to use tires of smaller diameter, larger cross section, and lower air pressure inside the tires.

The smaller diameter causes more rotations of the tire per minute for a given vehicle speed. The larger cross section and lower air pressure produces greater flexures of the sidewalls with each rotation. Each of these factors results in the generation of more heat.

Attempts have been made to produce safe, long lasting tires by improving the materials used and by changes in the arrangement of fibers and rubber to increase tire sidewall strength and reduce internal friction during flexion. A reduction in the number of plys from six, to four, and down to two ply construction has resulted from these attempts by tire designers to reduce flexural heat.

Such reduction in the thickness of sidewalls has made the sidewalls of modern tires increasingly subject to injury by the impact to the sidewalls, as for example in striking a curb when attempting to enter a short parking space.

A chief object of this invention is to reduce the operating temperatures of modern rubber tires for motor vehicles and aircraft.

Another object is to strengthen the sidewalls of tires without appreciably reducing the flexibility of the sidewalls.

Another object is to provide a modified design for sidewalls which can easily be incorporated in existing tire making molds.

A still further object is to substantially improve the strength and life of pneumatic tires with little increase in the weight or amount of material used in construction.

Figure 1:
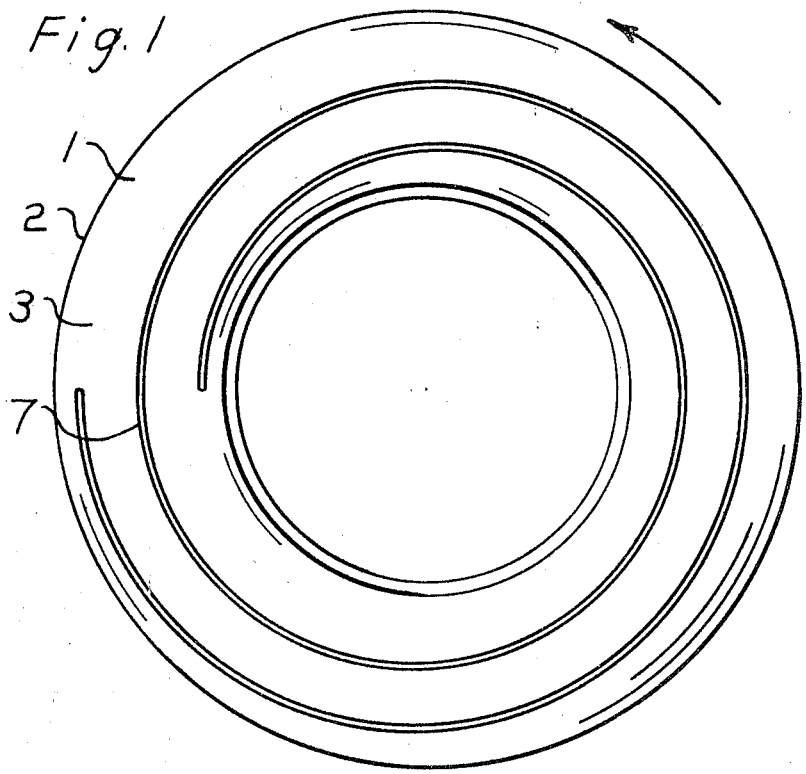

Further objects will be apparent to one skilled in the art from a study of the following description and drawings in which FIGURE 1 shows a side view of a tire incorporating this invention.

Figure 2:
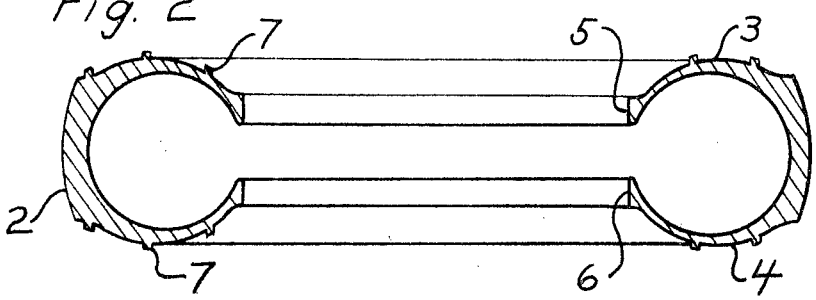

FIGURE 2 is a cross section view of said tire.

In the drawings, where like numerals refer to similar elements, 1 represents generally a pneumatic rubber tire having a tread 2, sidewalls 3, 4 and beads 5, 6. Whether tire 1 is designed for use with an inner tube or for "tubeless" operation is immaterial to the objectives of this invention.

A spiral rib 7 projects outwardly from each sidewall in the range of one-quarter to one-half inch.

This spiral preferably makes two complete revolutions between the bead and the tread, and is preferably directed backwardly with relation to the normal rotation of the tire.

This configuration has been found to result in lower operating temperatures of the tire. It is the theory of this inventor, although he does not intend to be bound by the accuracy of this theory, that the reduction in operating temperature results from an augmentation by the spiral rib of the natural radial flow of ambient air from the bead toward the tread as the tire rotates, caused by centrifugal force imparted to the air in close proximity to the sidewall. In addition to this augmentation of the ordinary outward flow of air, it is believed that the ribs create a turbulence in this flow of air which reduces the boundary layer of relatively motionless air at the interface between the tire and the atmosphere and thus increases heat flow from sidewall to atmosphere. It is obvious that the rib adds to the surface area of the sidewall, which in itself inevitably would result in more rapid transfer of heat from the sidewall to the atmosphere.

In the past attempts have been made to cool tires by providing radial ribs on sidewalls, and radially extending holes at the sidewalls. These concepts ignored the fact that most of the heat generated in a tire is due to the flexure of the sidewalls, and the proposed "improvements" would create more additional heat by stiffening the sidewalls than could be carried away by the "cooling" expedients.

This invention does not appreciably stiffen the sidewall in its normal operation.

The spiral rib does, however, provide protection from injury to the sidewall by substantial lateral blows as are encounted when striking a curb.

The spiral rib also provides a wearing surface to protect the modern thin sidewall in scuffing contact with curbs.

The spiral rib may be provided in tires by simply making a spiral groove of the desired proportions in existing tire molds.

While I have shown a preferred embodiment of my invention, it would be possible to achieve most of the objectives of this invention by providing a spiral rib which made between one complete turn and three complete turns as it extends from bead to tread.

It also has been found that reversing the heretofore described direction of the spiral relative to the rotation of the tire does not substantially reduce the cooling effectiveness of this invention. It is believed that this is a consequence of increasing turbulence in the boundary layer which largely compensates for the loss of augmentation of centrifugal flow of ambient air as heretofore described.

I claim as my invention:

1. In a pneumatic tire for use on motor vehicles and aircraft, a spiral rib projecting outwardly between one-quarter to one-half inch from the outer surface of the sidewall, said spiral making between one and three complete revolutions as it progresses from a starting location adjacent the bead to its end adjacent the tread, said spiral running in a direction backwards with relation to the normal forward rotation of the wheel.

2. In a tire as described in claim 1, said spiral rib having side surfaces substantially perpendicular to the plane of rotation of the tire.

References Cited

UNITED STATES PATENTS

| 1,206,948 | 12/1916 | Van Wagenen | 152—353 X |
| 2,199,466 | 5/1940 | McRaven | 152—353 |

FOREIGN PATENTS

| 160,017 | 8/1957 | Sweden. | |

ARTHUR L. LA POINT, Primary Examiner

CHARLES B. LYON, Assistant Examiner